United States Patent [19]
Brook

[11] 3,997,013
[45] Dec. 14, 1976

[54] SORTING SYSTEMS AND SENSING DEVICES FOR USE THEREWITH

[75] Inventor: Richard Morley Brook, Huddersfield, England

[73] Assignee: AutoSystems Limited, Huddersfield, England

[22] Filed: Aug. 5, 1974

[21] Appl. No.: 495,016

[30] Foreign Application Priority Data

| | | |
|---|---|---|
| Aug. 7, 1973 | United Kingdom | 37314/73 |
| Sept. 29, 1973 | United Kingdom | 45643/73 |
| Feb. 14, 1974 | United Kingdom | 6711/74 |
| May 30, 1974 | United Kingdom | 23959/74 |

[52] U.S. Cl. .................... 177/52; 209/121
[51] Int. Cl.[2] .................... G01G 13/00
[58] Field of Search ............ 177/52–57, 177/83, 119; 209/121; 198/39

[56] References Cited
UNITED STATES PATENTS

| | | | |
|---|---|---|---|
| 2,699,329 | 1/1955 | Bean | 177/50 |
| 2,876,901 | 3/1959 | Roth | 209/121 |
| 3,053,332 | 9/1962 | Buchtenkirch et al. | 177/52 |
| 3,089,554 | 5/1963 | Watson | 177/52 |
| 3,291,303 | 12/1966 | Altenpohl | 209/121 |
| 3,434,555 | 3/1969 | Wyatt | 177/132 |
| 3,642,130 | 2/1972 | Altenpohl | 209/121 |
| 3,651,939 | 3/1972 | Harben | 209/121 |
| 3,805,904 | 4/1974 | Zimmerer | 177/1 |

Primary Examiner—L. T. Hix
Assistant Examiner—Vit W. Miska
Attorney, Agent, or Firm—John C. Smith, Jr.

[57] ABSTRACT

A sensing device is provided which increases the versatility of sorting and conveying systems employing the device while simplifying their construction. The sensing device comprises a weight sensor and means for at least momentarily causing the weight of an article to apply a force directly or indirectly to the weight sensor.

4 Claims, 4 Drawing Figures

U.S. Patent  Dec. 14, 1976  Sheet 1 of 2  3,997,013
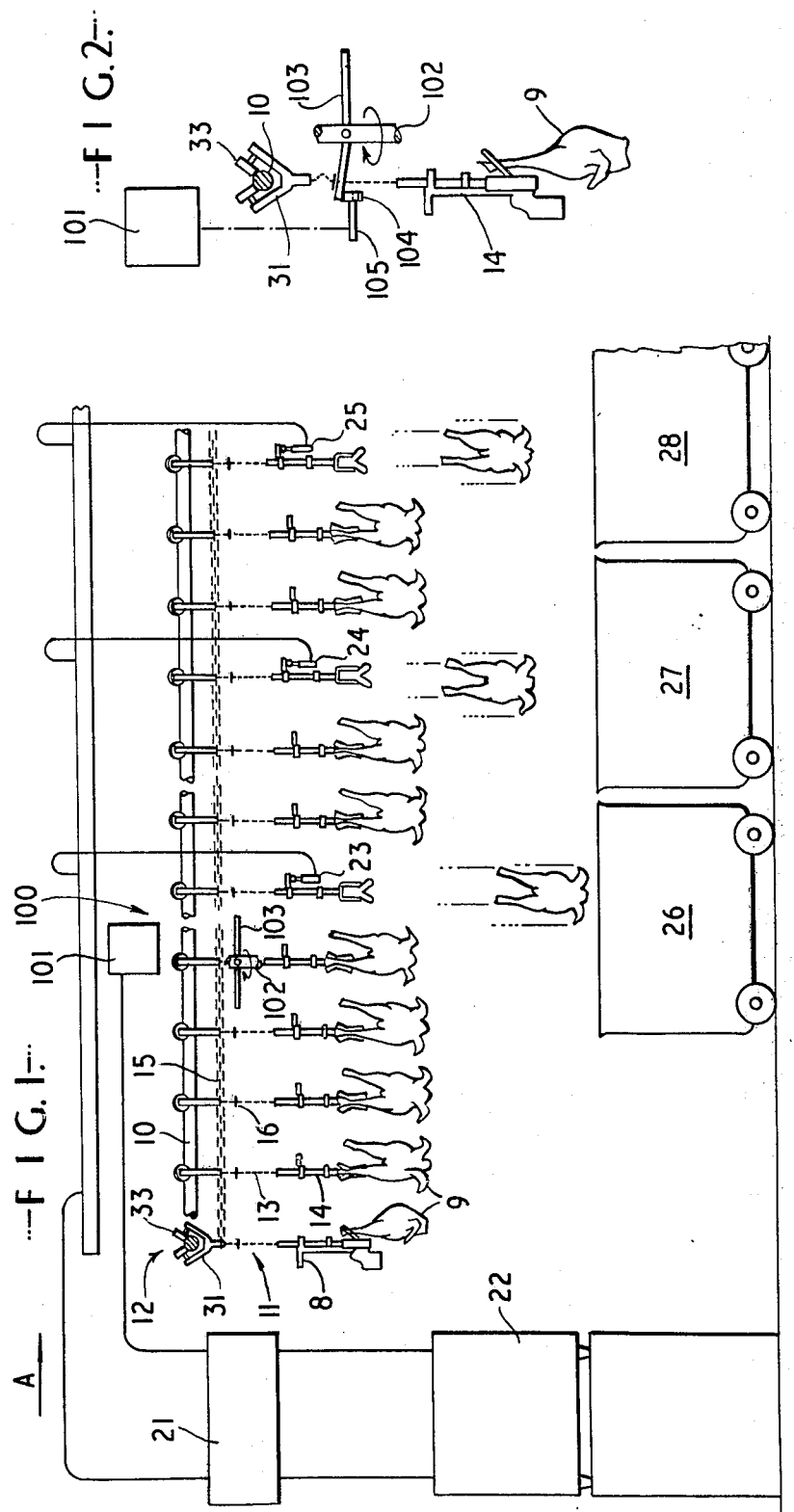

SORTING SYSTEMS AND SENSING DEVICES FOR USE THEREWITH

BACKGROUND TO THE INVENTION

The invention relates to sorting and sensing apparatus, and particularly but not exclusively to such apparatus for use in poultry processing.

DESCRIPTION OF THE PRIOR ART

Sorting and sensing apparatus is known for use in the processing of poultry. It is common in poultry processing to convey a succession of carcasses through various processing stations, and frequently it is desired to sort the carcasses by weight after a particular process or set of processes has been carried out. However, the known apparatus has not been particularly versatile and has been cumbersome in operation. In general weighing has been carried out using scale beams and similar apparatus which is bulky and takes considerable time to set up on a conveyor system. In general when it has been desired to sort carcasses into say, three weight ranges, it has been necessary to provide three or more scale beams, at least one for each weight range. Furthermore it has generally been necessary to provide a section of floating conveyor track associated with each scale beam and this substantially increases the cost of installing the conveyor track and the time taken for installation. Once the known systems have been installed, they do not lend themselves to further adaptation and are relatively inflexible. For instance it is relatively difficult to vary the number of weight ranges catered for, or to adjust the limits of existing ranges.

SUMMARY OF THE INVENTION

It is an object of the invention to overcome the disadvantages of the prior art sorting and sensing apparatus by providing a sensing device which is more versatile and simpler to use than scale beams, and allows greater flexibility in the construction of sorting and conveying systems. Accordingly the invention provides, according to one aspect, a sensing device for use with apparatus for sorting articles which are moving along a path, comprising a weight sensor and means for at least momentarily causing the weight of an article to apply a force directly or indirectly to the weight sensor.

A particularly advantageous form of sensing device according to the invention employs an electronic transducer and a rotatable member operable to pick up an article and apply the load of the article to the transducer.

It is another object of the invention to provide apparatus for weighing articles which are moving in succession along a path which is less prone than known apparatus to interference with the article being weighed by adjacent articles. This problem is particularly acute in the case of processing poultry carcasses on an overhead conveyor where the wing of one carcass may easily catch on the wing of another adjacent carcass while it is being weighed, thereby giving a false weight reading. It has been proposed to increase the spacing of carriers which support articles but this reduces the throughput of articles.

The invention provides apparatus for weighing articles which are moving in succession along a path, comprising a sensing device for arrangement in the path, which device emits a signal related to the weight of an article sensed by the device, and means to space apart, or increase the spacing of, the articles in the region of the sensing device.

The use of a weight sensor such as an electronic transducer enables systems of great flexibility to be constructed. For instance the weight ranges into which a plurality of articles are sorted may be varied automatically if desired, to suit conditions and requirements, and according to another aspect of the invention a sorting system comprises apparatus for sorting articles into groups according to at least one pre-selected parameter, means for sensing the rate at which the articles are sorted into at least one of the groups, and means for changing at least one of the parameters if the rate at which articles are sorted into the said group differs from a desired rate.

Furthermore the calibration of a system incorporating a weight sensor according to the invention can readily be monitored, and adjusted if necessary. Accordingly another aspect of the invention provides a conveyor system for use in conveying a succession of articles along a path, the system having a sensing device for arrangement in the path to emit a signal when an article moves past the device, the signal having a pre-calibrated relationship to the weight of the article, and the conveyor having at least one reference weight thereon, so that the calibration of the system may be checked when the reference weight passes the sensing device.

The invention also includes a method of conveying a succession of articles along a path, comprising arranging the articles on a conveyor which is travelling along the path, sensing the weight of each article at a point on the path, generating a signal which bears a re-calibrated relationship to the weight of the article, and periodically checking the calibration by sensing the weight of at least one reference weight arranged on the conveyor.

BRIEF DESCRIPTION OF THE DRAWINGS

FIG. 1 is a diagrammatic view of one embodiment of weight sensor and sorting apparatus according to the invention;

FIG. 2 is a view of part of the apparatus of FIG. 1, looking in the direction of arrow A;

DESCRIPTION OF EMBODIMENTS OF THE INVENTION

Figure 3:
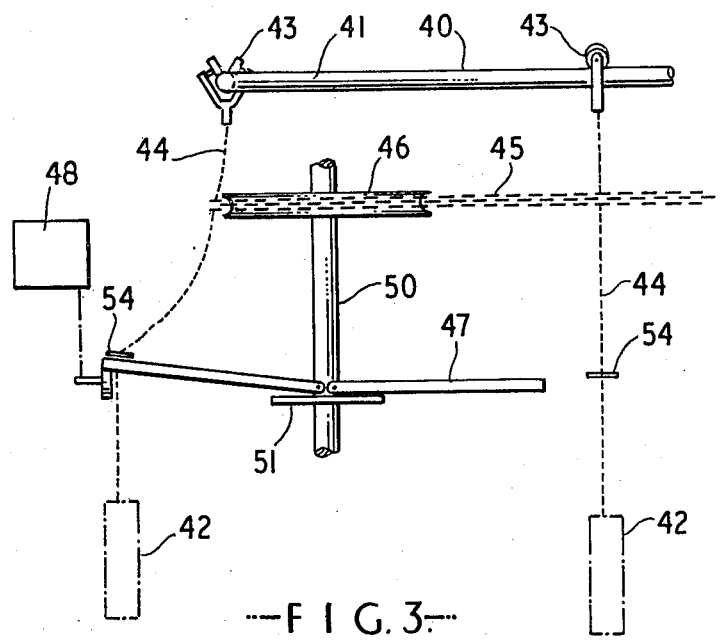
FIG. 3 is a diagrammatic view of part of an alternative embodiment of the invention.

In the processing of poultry it is common to transport birds (e.g. chickens) on conveyors for transport through various processing stations such as plucking stations and cleaning stations, and it is frequently necessary to sort the poultry carcasses according to weight. This example relates to a conveyor at the final stage of a poultry processing plant, where it is desired to sort the finished carcasses into 2 ounce weight ranges. While there may be as many as 11 or more (e.g. 30) such weight ranges in practice, for example from a 4 lb/4 lb 2 oz range to a 5 lb 4 oz/5 lb 6 oz range, apparatus for sorting into three weights or three ranges of weight only will be described, for simplicity.

FIG. 1 shows part of an endless conveyor comprising a continuous rail 10 along which a plurality of poultry carriers 11 are slidable. Each carrier comprises a carriage 12 arranged on the rail, a chain 13 hanging below the carriage, and a shackle 14 arranged to grip a poultry carcass 9. All the chains 13 are interconnected by a driving chain 15 for pulling the carriers along the rail. Each carrier also has, between the gripping unit 14 and the point of connection of the chain 15 to the chain 13, a stop member in the form of a disc 16.

The shackles 14 are of a conventional type and will not be described in detail. They each have a release lever 8 which, when moved upwardly, causes the shackle to release the carcass which it is carrying.

Positioned at a weighing station 100 is an electronic cell 101, and a vertical shaft 102 having a plurality of radially extending spokes 103. The spokes are pivotally connected to the shaft 102 such that they are free to pivot upwardly above the horizontal, but cannot move below the horizontal. Normally, therefore, gravity maintains the spokes in a position in which they are perpendicular to the shaft 102. The spokes have forked ends, and as the carriers 11 move along the rail 10 each chain 13 in turn engages in the forked end of one of the spokes, at a point immediately below the stop member 16. Thus the shaft 102 is rotated as the carriers 11 move through the weighing station 100. Mounted to one side of the shaft 102 is a roller 104. The roller is rotatable on a horizontal shaft 105 and is positioned so that as each spoke 103 is swung around by a carrier engaged therewith, the spoke rides up and over the roller. One spoke is shown in its uppermost position in FIG. 2 and it will be seen that the stop member 16 is unable to pass through the forked end of the spoke so as the spoke rises it lifts the shackle 14, thereby momentarily applying the load of the shackle to the shaft 105, which is connected to the electronic cell 101.

The cell is arranged to transmit an electrical signal when load is applied to the shaft 105. The voltage of the signal is proportional to the load applied, and is passed to control means for the apparatus comprising an analogue to digital converter 21 coupled to a control unit 22. The control unit 22 controls the action of three pneumatically driven release units 23 to 25 which are operable to raise the lever 8 of each shackle 14 to free a carcass from the shackle as it passes the release units. Beneath the three units 23 to 25 there are arranged respectively three receiving bins 26 to 28. The bins are for the receipt of chicken carcasses lying within three weight ranges, X, Y and Z respectively.

When the conveyor is running the chain 15 moves to the right as viewed in FIG. 1 and each shackle 14, in turn, together with the chicken carcass gripped thereby, engages a spoke 103 and is raised thereby onto the roller 104. When the weight of shackle 14 and its carcass is applied to the roller 104. a signal is transmitted from the cell 101 to the converter 21 and the control unit 22 receives a signal indicating which weight range the relevant chicken carcass lies within. This information is then memorised and when the relevant shackle 14 passes the release unit (23, 24 or 25) appropriate to that weight range the carcass is freed from the gripping unit and falls into the appropriate bin.

Thus if the shackle 14 immediately to the left of shaft 102, as viewed in FIG. 1, carries a carcass lying within the weight range X, the control unit 22 will receive an appropriate signal when the shackle 14 is raised on to the roller 104. The control unit is programmed to activate the release unit 23 after an interval of time equal to that required for a shackle 14 to travel from the roller 104 to the unit 23. Similarly the unit 22 is programmed such that when it receives a signal indicating that a carcass within weight range Y is on roller 104, it activates release unit 24 after a time interval equal to that required for travel of a shackle 14 from roller 104 to the unit 24. Similar programming arrangements are made for the activation of release unit 25 and the control unit 22 is such that it can memorise a succession of signals received. Thus as each shackle is weighed the unit 22 stores the information concerning the weights of the shackles and the carcasses carried thereby will be freed when each carcass is above its appropriate bin.

The shackles are raised and weighed so that there is no disturbance of the position of the chain 15. If a floating portion of the rail 10 were provided for example, the whole of an article carrier 11 would be moved downwardly during weighing. Thus the relevant portion of the chain 15 would be pulled downwards and the increased tension in the chain would interfere with the weighing measurement.

It is important that the shackles are able to run as freely as possible and the form of rail 10 and carriages 12 has been found to be particularly effective in this respect. The rail comprises a cylindrical tube and each carriage comprises a Y-shaped bracket 31, the arms of the Y each carrying a shaft on which a wheel 33 is mounted. The wheels run along the upper surfaces of the tube as shown.

The control unit 22, instead of being arranged to activate a release unit after a particular time interval, may be arranged to activate it after a particular number of articles have passed a fixed point. For this purpose an article sensing means (e.g. a proximity switch) may be provided at a fixed point, the control unit 22 being arranged to count pulses received from the article sensing means.

Under certain circumstances a user of the apparatus described above may wish to deposit carcasses at a particular rate into at least one of the bins, bin 26 for example. He may wish to do this, for instance, to meet a demand for carcasses having a weight in the region of range X for example. If there are sufficient carcasses on the conveyor which lie within range X then the requirements are automatically fulfilled but if the number of carcasses within range X is less than that required to meet the demand the user may wish to increase range X to encompass a wider weight band, thereby increasing the rate at which carcasses are sorted into bin 26.

The control unit 22 is arranged to activate the release unit 23 each time a carcass is to be released into the bin 26. If desired the unit 22 can be arranged to feed a pulse to a first counter each time the unit 23 is activated, thereby counting the number of carcasses fed to the bin 26. A requirement indicating unit is incorporated in the control unit and can be set to feed pulses to a second counter at a rate corresponding to the desired rate of feed of carcasses into the bin 26. Means is also provided within the control unit to compare the counts of the two counters, this comparing means being arranged to act on the control unit 22 to broaden range X whenever the count recorded by the first counter falls below that recorded by the second counter. The arrangement can be such that once the count recorded by the first counter catches up with that recorded by the second counter, the range X is returned to its normal limits.

The apparatus may be provided with dials or other similar controls to preselect the desired ranges and other parameters. The arrangement may be such that the range X changes from a preselected weight range to a second wider preselected weight range and back again, according to demand, or the range may be arranged to widen progressively until the demand is met, and then decrease progressively if demand is exceeded.

In order to ensure that the weighing system remains accurately calibrated three known reference weights may be arranged on three of the shackles, spaced apart equi-distantly around the rail 10. Means are provided to specially identify each reference weight when it reaches the roller 104 and the resultant signal transmitted by the cell 101 to the control unit 22 is then used to check, and if necessary adjust, the calibration of the appropriate weight range. The first reference weight has a value lying in the middle of range X, the second weight has a value lying in the middle of range Y and the third has a value lying in the middle of range Z. However if the signals vary with the weights sensed according to a linear relationship, then a single reference weight may be used. It is not essential that the number of reference weights used equals the number of weight ranges. If it is desired to increase the frequency with which the calibration is checked, a plurality of spaced apart identical reference weights may be used, the calibration being checked each time one of the weights passes the sensing device. For example every fiftieth carrier 11 may carry a reference weight.

Figure 4:
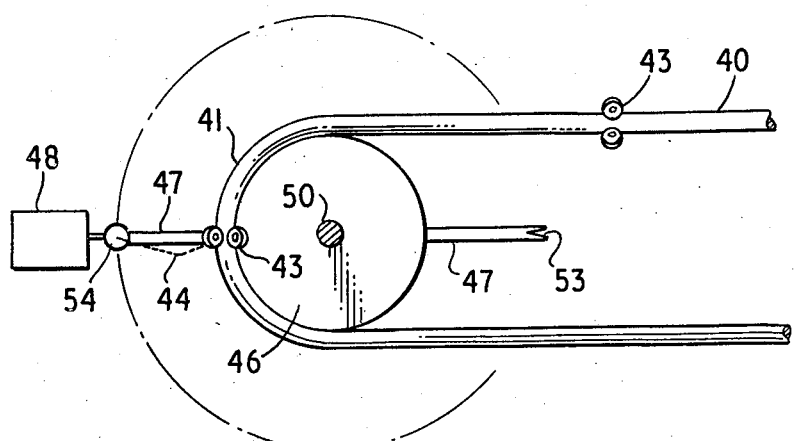
FIG. 4 is a schematic plan view, with some parts omitted for clarity.

FIGS. 3 and 4 show an alternative arrangement of weighing station, positioned at a point where a conveyor track 40 makes a 180° turn, by means of a semi-circular portion of track 41. Shackles 42 for carrying chicken carcasses are suspended from wheels 43 which run on the track. The shackles are suspended by chains 44 or other such flexible suspension members. All the chains are interconnected by a horizontal driving chain 45 which runs around a pulley wheel 46.

Mounted below wheel 46 but rotatable therewith are a series of arms or spokes 47, only two of which are shown, pivotally connected to a shaft 50 carrying the wheel 46. The downward pivotal movement of the arms is restricted by a supporting plate 51 mounted on the shaft 50 so that they cannot pivot below the horizontal. The arms have grooved ends 53 and are so spaced in relation to the wheels 43 (only two of which are shown) that as a wheel 43 approaches the 180° turn its depending chain 44 engages the grooved end of an arm 47 and the chain and its dependent shackle are swung outwardly to travel around a greater arc length than the associated wheel 43. As a result the shackles 42 are spaced further apart as they move round the bend than they are when they move along straight track. The greater the length of arms 47 with respect to the radius of wheel 46, the greater is the increase in spacing. The path followed by the shackles when moving round the 180° turn is shown in dotted lines in FIG. 2.

As the shackles move round the bend they are each (together with any chicken carcass carried thereby) weighed by a sensing cell 48 arranged adjacent to the path swept by the arms 47 and supporting a wheel 49. The wheel 49 is arranged to extend upwardly into the path of the arm 47 so that each arm must ride over the wheel 49. As each arm rises, it lifts the corresponding shackle because each chain 44 has a stop in the form of disc 54 fixed thereto at a point just above the normal height of the arms 47 and the disc cannot pass through the grooved end 53 of the associated arm. A ramp member (not shown) is provided to guide each arm up on to the wheel 49. At the point when the arm is riding over the wheel the cell 48 is subjected to a load related to the weight of the respective arm 47, lower portion of chain 44 and shackle 42, plus the weight of any carcass carried thereby. The weight of the arm, chain and shackle is constant and thus the sensing cell produces a signal which varies with the weight of the chicken carcasses. The signal is unaffected by tension in the chain 45 as the upper portion of chain 44 is slack during weighing. Since the spacing between the shackles is increased in the weighing area, there is less risk that one carcass will foul on another as it is being raised for weighing.

If desired the cell 48 may be mounted under the arms 47. Furthermore, since each arm 47 is loaded in compression when it engages and deflects one of the shackles, and as the compressive load will vary dependent on the weight of carcass carried by the shackle, the weighing may be carried out by providing means to monitor the compressive load on the arms, instead of of using the cell 48 and 49 as shown.

Alternatively, a weigh cell may be provided on each spoke, to bear the weight of a shackle as the spoke runs up over a roller or other deflector which causes the weight of the shackle to be applied to the spoke.

The arrangement shown in FIGS. 3 and 4 comprises a very effective weight sensing device, which is versatile in use. As will be seen from the above examples, it is not essential that the sensing device be arranged at a point where the conveyor passes round a corner or other bend. Furthermore it is not essential that the sensing device be arranged to deflect carriers outwardly of the conveyor, although this is useful where it is desired to increase the spacing between carcasses during weighing, for example to reduce the risk of the wing of one carcass catching on the wing of an adjacent carcass. The sensing device may however take other forms. It may for example comprise a spoked or other wheel, or a plurality of wheels arranged adjacent to a rim of the conveyor (e.g. with the conveyor tangential to the wheel or wheels).

It is not essential that the sensing device be used to sort articles according to their weight. For example it may be used to count articles by sensing, by weight, whether an article is present on a carrier or not as a succession of carriers move past.

Alternate forms of shackle may be used.

I claim:
1. A weight sensing device for use with apparatus for sorting articles which are moving along a path, comprising:
    a. an electronic transducer arranged to emit a signal related to the weight of each article sensed by the device as each article moves through a weighing station located along at least a portion of said path,
    b. at least one member rotatable about a fixed axis at said weighing station and including means to both receive and support each article as said article passes through said weighing station, and
    c. means to transmit a load to said transducer and positioned in the path of said rotatable member such that said rotatable member while supporting said article must rise and ride over said means to apply its load to said means and transducer.

2. Apparatus for weighing articles which are moving in succession along a path, wherein said path includes a bend therein, said apparatus comprising:
    a. a weight sensor adapted to emit a signal related to the weight of each article in succession, b. means disposed at said bend in said path and connected to said weight sensor for at least momentarily causing the weight of each article as it moves along said path to apply a force directly or indirectly to said weight sensor,
c. a conveyor extending along said path, and
d. means suspending said articles individually from said conveyor whereby said articles are caused to swing outwardly and radially of said bend as they move around the bend, thereby increasing the spacing between said articles.

3. Apparatus as claimed in claim 2, in which the articles are swung outwardly by a part of the sensing device which engages the articles and pushes them outwardly.

4. Apparatus as claimed in claim 3, in which the said part of the sensing device comprises a rotatable arm.

* * * * *